United States Patent [19]

Duerr

[11] Patent Number: 5,512,618

[45] Date of Patent: Apr. 30, 1996

[54] SUSPENSION-ENHANCING ADHESIVE ADDITIVE FOR PAPER MANUFACTURING, LIQUID ADHESIVE COMPOSITION USING SAME, AND METHOD OF PREPARING LIQUID ADHESIVE COMPOSITION

[75] Inventor: Frederick G. Duerr, Walla Walla, Wash.

[73] Assignee: Enviro-Chem, Inc., Walla Walla, Wash.

[21] Appl. No.: 369,119

[22] Filed: Dec. 27, 1994

Related U.S. Application Data

[63] Continuation of Ser. No. 58,448, May 7, 1993, abandoned.

[51] Int. Cl.[6] ............................. C08L 3/00; C08L 89/00; C08K 5/06; B32B 7/12
[52] U.S. Cl. ........................ 524/47; 524/377; 428/355
[58] Field of Search ....................... 524/47, 377; 428/355

[56] References Cited

U.S. PATENT DOCUMENTS

| | | | |
|---|---|---|---|
| 2,945,775 | 7/1960 | Lehman et al. | 117/155 |
| 3,141,813 | 7/1964 | Marek et al. | 162/135 |
| 3,231,533 | 1/1966 | Garrett et al. | 260/29.6 |
| 3,644,257 | 2/1972 | Nickerson et al. | 260/29.6 WB |
| 3,787,232 | 1/1974 | Mikofalvy et al. | 117/155 UA |
| 3,936,339 | 2/1976 | Lock et al. | 156/205 |
| 4,010,126 | 3/1977 | Kuzma | 525/7 |
| 4,018,959 | 4/1977 | Demko et al. | 428/182 |
| 4,256,809 | 3/1981 | Larsson et al. | 428/473 |
| 4,274,905 | 6/1981 | Itoh et al. | 156/462 |
| 4,324,832 | 4/1982 | Moroff et al. | 428/289 |
| 4,339,292 | 7/1982 | Itoh et al. | 156/206 |
| 4,339,505 | 7/1982 | Ragas et al. | 428/514 |
| 4,397,984 | 8/1993 | Wendel et al. | 524/814 |
| 4,424,291 | 1/1984 | Leake et al. | 524/47 |
| 4,495,029 | 1/1985 | Bergmann et al. | 162/135 |
| 4,568,714 | 2/1986 | Overholt | 524/47 |
| 4,773,967 | 9/1988 | Peppmoller et al. | 162/168.2 |
| 4,775,706 | 10/1988 | Iovine et al. | 524/47 |
| 4,784,724 | 11/1988 | Pfohl et al. | 162/168.2 |
| 4,853,072 | 8/1989 | Thompson et al. | 156/470 |
| 4,857,126 | 8/1989 | Soremark et al. | 156/205 |
| 4,880,497 | 11/1989 | Pfohl et al. | 162/135 |
| 4,892,620 | 1/1990 | Beuzelin et al. | 162/158 |
| 4,966,652 | 10/1990 | Wasser | 162/135 |
| 5,032,225 | 7/1991 | Saji et al. | 162/135 |
| 5,112,445 | 5/1992 | Winston, Jr. et al. | 162/178 |
| 5,137,961 | 8/1992 | Goos et al. | 524/457 |
| 5,139,614 | 8/1992 | dePierne et al. | 162/135 |
| 5,194,328 | 3/1993 | Suzuki et al. | 428/328 |
| 5,208,285 | 5/1993 | Boyce et al. | 524/516 |

*Primary Examiner*—Paul R. Michl
*Assistant Examiner*—LaVonda R. DeWitt
*Attorney, Agent, or Firm*—Kolisch Hartwell Dickinson McCormack & Heuser

[57] ABSTRACT

A suspension-enhancing adhesive additive is described for an aqueous, starch-containing, liquid adhesive to be used in manufacturing corrugated paperboard. The additive includes a suspension-enhancing agent with a synthetic liquid polymer component. The polymer component is emulsifiable in the adhesive, and is capable of enhancing suspension of such starch. The polymer component may be based on at least one acrylic-acid monomer, and may be a copolymer based on an acrylic-acid monomer and an aromatic monomer substituted with an acrylate compound. The agent may also include an effective amount of an alcohol-ester coalescing agent. Also described is a liquid adhesive composition for manufacturing corrugated paperboard, which composition incorporates the additive. Also described is a method of preparing a starch-based, liquid adhesive composition for manufacturing corrugated paperboard.

4 Claims, No Drawings

SUSPENSION-ENHANCING ADHESIVE ADDITIVE FOR PAPER MANUFACTURING, LIQUID ADHESIVE COMPOSITION USING SAME, AND METHOD OF PREPARING LIQUID ADHESIVE COMPOSITION

This is a continuation of application Ser. No. 08/058,448, filed May 7, 1993, now abandoned.

BACKGROUND AND SUMMARY OF THE INVENTION

The present invention relates generally to adhesive additives for paper manufacturing. More particularly, it concerns a suspension-enhancing, relatively nontoxic adhesive additive for making corrugated containers of paperboard.

The general manufacturing techniques for making corrugated containers of paperboard, also referred to in the industry simply as corrugated paperboard, are well known. As background for the present invention, the disclosures of U.S. Pat. No. 4,853,072 to Thompson and U.S. Pat. No. 4,424,291 to Leake, et al. are incorporated herein by reference.

Essentially, corrugated paperboard is made from two types of components, a corrugated paper one and plural planar (i.e. uncorrugated) paper ones. Corrugated paperboard is assembled by sandwiching the corrugated paper component between opposing planar paper components. In the context of sandwiching those components, it is necessary to make a bond between inner surfaces of the opposing planar paper components and outer surfaces of the corrugated paper component.

To make such a bond, various adhesives have been proposed, and most of them are based on an aqueous mixture of starch and certain additives that impart desired qualities. For example, it is known to make the adhesive water-resistant by adding an effective amount of a urea-formaldehyde polymer resin. Other proposals include adding surfactants to increase the permeability of the paperboard, adding defoaming agents, and adding biocides. As used herein, starch means any suitable starch product such as cornstarch, or any other known starch, examples of which are described in Leake et al.

To prepare such adhesives :for application to desired surfaces of the planar and corrugated paper components, conventional methods involve making a so-called "starch batch" of adhesive according to the following steps:

(1) preparing a "pre-gel" or so-called carrier starch by combining an effective amount of a special starch to an NaOH solution and heating the resulting mixture to about 140°–145° F., thereby causing it to become a thixotropic paste-like substance;

(2) adding a desired additive like a urea-formaldehyde polymer resin;

(3) diluting the "pre-gel"/carrier starch with a desired amount of water; and (4) adding an additional, desired amount of ordinary starch.

By "special starch", applicant means a starch characterized chemically by having a highly branched configuration. By "ordinary starch", applicant means a starch characterized chemically by having a straight-chain configuration. Both types of starch are commercially available, but there is a higher cost associated with the special kind.

By preparing the "pre-gel"/carrier starch, conventional adhesives are capable of keeping the ordinary starch in suspension. To use ultimately the conventional "starch batch" of adhesive after following the above preparation process, the starch batch is delivered to a suitable applicator machine which heats it to about 350° F. and applies it to desired surfaces of the planar and corrugated paper components. Such known machinery is shown and an example is described in. Thompson. The machinery is generally referred to as a corrugating machine, or corrugator.

Referring again to conventional adhesive proposals, there have been attempts to modify the aqueous-starch-adhesive mixture with various synthetic polymer resins such as emulsion polymers, solution polymers, acid-curable polymers, and alkaline-curable polymers. Each is designed to provide certain improved features. For example, Leake, et al. describes a certain acrylic-acid-based adhesive composition that is designed to improve tack performance. Tack, also referred to in the industry as "green bond strength", is the bond strength between the planar paper components and the corrugated paper component immediately after their adhesive-wetted surfaces are contacted.

None of the conventional proposals for such adhesive compositions has focused on providing enhanced suspension without using a special starch. Conventional "pre-gel"/carrier starches are always prepared using a special starch. Also lacking in the prior art is an adhesive composition that provides a combination of increased runnability and water resistance, while at the same time providing an end product that dries harder than that made with conventional compositions. The feature of drying harder would allow for a reduction in thickness of paperboard used in such manufacturing, and a corresponding reduction in raw-material costs. The resulting harder paperboard product would also respond to printing better than that made from conventional compositions.

Accordingly, it is a principal object of the present invention to provide an adhesive additive for starch-containing adhesives used to manufacture corrugated paperboard that overcomes the drawbacks and limitations of prior art proposals.

Another object is to provide such an additive that enhances suspension of such starch without having to use a special starch characterized chemically by having a highly branched configuration.

Yet another object is to provide an adhesive based on such an additive that offers a combination of increased runnability and water resistance, while also providing a finished paperboard product that dries harder than that made with conventional compositions.

Another important object of the invention is to provide a method for preparing such an adhesive based on such an additive.

It is also an object of the invention to provide such an adhesive additive that can be easily and cost-effectively manufactured.

A further object of the invention is to provide such an adhesive that lacks undesired, highly toxic resins like urea-formaldehyde resin.

In brief summary, one aspect of the invention includes a suspension-enhancing adhesive additive for an aqueous, starch-containing, liquid adhesive to be used in manufacturing corrugated paperboard. The additive includes a suspension-enhancing agent with a synthetic liquid polymer component, and which polymer component is emulsifiable in the adhesive, and is capable of enhancing suspension of such starch. The polymer component is based on at least one acrylic-acid monomer, and may be a copolymer based on an acrylic-acid monomer and an aromatic monomer substituted with an acrylate compound.

Another aspect of the invention involves a liquid adhesive composition for manufacturing corrugated paperboard. That composition includes an effective amount of a starch whose chemical composition is characterized by having a substantially straight-chain configuration. Also included is a suspension-enhancing agent like that described above. An amount of water is also included so that the overall composition includes between 0.5%–1.0% by weight of the additive, between 21.5–25.5% by weight of the starch, and between 73.5–78% by weight of the water.

Another aspect of the invention is a method of preparing a starch-based, liquid adhesive composition for manufacturing corrugated paperboard. The method includes the steps of (1) using an effective amount of a starch, characterized by having a substantially straight-chain configuration, to make a starch gel, (2) adding an additional, desired amount of the starch, (3) enhancing suspension of starch by adding to the composition a synthetic liquid polymer component capable of being emulsified in the composition, and (4) diluting the starch gel with a desired amount of water.

These and additional objects and advantages of the present invention will be more readily understood after a consideration of the drawings and the detailed description of the preferred embodiment.

DETAILED DESCRIPTION OF THE PREFERRED EMBODIMENT

The suspension-enhancing adhesive additive of the present invention is designed for an aqueous, starch-containing, liquid adhesive to be used in manufacturing corrugated paperboard. Several types of such liquid adhesives are known, and the present invention may be used with any of them.

The additive includes a suspension-enhancing agent with a synthetic liquid polymer component which is emulsifiable in the adhesive, and is capable of enhancing suspension of such starch. Preferably, that polymer component is based on at least one acrylic-acid monomer, and may be a copolymer based on an acrylic-acid monomer and an aromatic monomer substituted with an acrylate compound. The presently preferred polymer component is available commercially from McWhorter, Inc. under the trademark B67-46. As will be described, adding an effective amount of an alcohol-ester coalescing agent to the polymer component augments its function as a suspension-enhancing agent. The presently preferred coalescing agent is 2,2,4-trimethyl-1,3-pentanediol mono(2-methylpropanoate), which is commercially available from Eastman Chemical Company, a division of Eastman Kodak Company, and is sold under the trademark TEXANOL alcohol-ester coalescing agent.

The liquid adhesive composition of the present invention includes an effective amount of a starch whose chemical composition is characterized by having a substantially straight-chain configuration. A presently preferred starch is what is known as pearl starch. Preferably, the adhesive composition is composed of the following:

TABLE I

| Component | % by Weight of Total Composition |
| --- | --- |
| suspension-enhancing agent | 0.5–1.0% |
| pearl starch | 21.5–25.5% |
| sodium hydroxide | 0.2–0.5% |
| boric acid | 0.2–0.5% |
| water | 72.5–77.6% |

The suspension-enhancing agent may be the polymer component alone, or it may include the polymer component and the coalescing agent with the overall composition being 75–97% by weight polymer component and 3–25% by weight coalescing agent. The presently preferred composition has 90–95% by weight polymer component and 5–10% coalescing agent.

The liquid adhesive composition shown in Table I takes the form of an aqueous emulsion. Those skilled in the art know to add boric acid as a buffer, and to add sodium hydroxide to lower the gelling temperature of the starch from about 165° F. to about 145° F. Exclusive of a to-be-described preparation method, the composition is prepared using known techniques. With respect to addition of the suspension-enhancing agent, it should be added at any time after making the starch gel as described below.

Operation and Preferred Way of Practicing

To prepare the starch-based, liquid adhesive composition of the present invention, the following preparation method is practiced:

(1) use an effective amount of a starch, characterized by having a substantially straight-chain configuration, to make a starch gel;

(2) add an additional, desired amount of the starch;

(3) add to the starch gel a suspension-enhancing agent; and (4) dilute the starch gel with a desired amount of water.

The above preparation method can be performed using conventional mixing equipment and conventional mixing containers such as drums. The above method does not require the use of relatively expensive special starches with highly-branched, chemical configurations. By practicing the above method, it is also now possible to make the starch gel using ordinary starch. Known procedures can be used to make the gel itself. As an effective amount of starch in (1) above, those skilled in the art can use that amount they normally use for making conventional carrier starch gels.

To maintain suspension of the starch even further, gentle mixing of the above composition is recommended by using the usual paddle-type mixer, and by actuating it for about 5 minutes every 20 minutes of corrugator-operation time.

By using the adhesive additive of the present invention in an adhesive composition for manufacturing corrugated paperboard, a feature known as runnability is increased when compared to manufacturing with conventional adhesives. For example, testing has shown that a conventional corrugator will output approximately 24% more corrugated paperboard in a given work day when compared to its output using conventional adhesives.

The finished corrugated paperboard container made using the adhesive of the present invention has been found to offer increased stability in cold and/or relatively humid environments. For example, finished containers made using the adhesive of the present invention remain intact even if they are stored in cold and/or relatively humid environments. Such containers made from conventional adhesives and placed in such an environment tend to fall apart because the conventional adhesive is not as stable as the adhesive of the present invention. By cold environment, applicant means between 32° F. and 45° F. By relatively humid, applicant means 70–90% relative humidity.

A further advantage of using the adhesive of the present invention includes tending to make manufactured corrugated paperboard run flatter when it travels through the corrugator. Such paperboard made from conventional adhesives tends to bow or curve somewhat. The relatively flatter paperboard enables it to be cut more precisely because it is better shaped for positioning in a conventional cutting operation. With such precise cutting, there is less waste. Conventional cutting procedures used on paperboard made from conventional adhesives produce approximately 5–10% waste. Testing has shown that such waste is reduced by approximately 1% when the adhesive of the present invention is used to manufacture corrugated paperboard. That 1% reduction in waste translates into substantial reductions in raw-material costs.

The flatter paperboard product made with the invention also results in a product that tends to take printing better than paperboard made from conventional adhesives.

In operation, the adhesive of the present invention is pumped to a conventional corrugator which applies it to desired surfaces of paperboard (also referred to as liner board), as described further in Thompson. The adhesive can be applied using simple contact. Capillary pressure and surface tension cause it to penetrate and surround the inner surface fibers of the liner board. The adhesive dries hard and bonds the corrugated paper component to the planar paper ones. The suspension-enhancing agent forms a water-proof film which cannot migrate through or out of the paper components.

Conventional adhesive-application methods usually involve diluting the adhesive a desired amount (usually by about 50%). The presently preferred time for adding the suspension-enhancing agent is any time after making the starch gel but before pumping the adhesive to the corrugator.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. A liquid adhesive composition for manufacturing corrugated paperboard, consisting essentially of:

an effective amount of a starch whose chemical composition is characterized by having a substantially straight-chain configuration;

a suspension-enhancing agent which includes a synthetic liquid polymer component that is a copolymer based upon an acrylic-acid monomer and an aromatic monomer substituted with an acrylate compound, and includes an effective amount of the alcohol-ester coalescing agent 2,2,4-trimethyl-1,3-pentanediol mono(2-methylpropanoate), and which polymer component is emulsifiable in the composition, and is capable of enhancing suspension of such starch;

water; and with the overall composition including between 0.5%–1.0% by weight of the suspension-enhancing agent, between 21.5–25.5% by weight of the starch, and between 73.5–78% by weight of the water.

2. A method of preparing a starch-based, liquid adhesive composition for manufacturing corrugated paperboard, comprising:

using an effective amount of a starch, characterized by having a substantially straight-chain configuration, to make a starch gel;

diluting the starch gel with a desired amount of water;

adding an additional, desired amount of the starch; and enhancing suspension of starch in the composition by adding to the composition a suspension-enhancing agent which includes a synthetic liquid polymer component that is a copolymer based upon an acrylic-acid monomer and an aromatic monomer substituted with an acrylate compound, and which polymer component includes an effective amount of the alcohol-ester coalescing agent 2,2,4-trimethyl-1,3-pentanediol mono(2-methylpropanoate), and which polymer component is emulsifiable in the composition, and is capable of enhancing suspension of such starch.

3. A liquid adhesive composition for manufacturing corrugated paperboard, consisting essentially of:

an effective amount of a starch whose chemical composition is characterized by having a substantially straight-chain configuration;

a suspension-enhancing agent which includes a synthetic liquid polymer component that is a copolymer based upon an acrylic-acid monomer and an aromatic monomer substituted with an acrylate compound, and which polymer component is emulsifiable in the composition, and is capable of enhancing suspension of such starch;

water; and with the overall composition including between 0.5%–1.0% by weight of the suspension-enhancing agent, between 21.5–25.5% by weight of the starch, and between 73.5–78% by weight of the water.

4. A method of preparing a starch-based, liquid adhesive composition for manufacturing corrugated paperboard, comprising:

using an effective amount of a starch, characterized by having a substantially straight-chain configuration, to make a starch gel;

diluting the starch gel with a desired amount of water;

adding an additional, desired amount of the starch; and enhancing suspension of starch in the composition by adding to the composition a suspension-enhancing agent which includes a synthetic liquid polymer component that is a copolymer based upon an acrylic-acid monomer and an aromatic monomer substituted with an acrylate compound, and which polymer component is emulsifiable in the composition, and is capable of enhancing suspension of such starch.

* * * * *